Aug. 23, 1966      D. F. MELTON      3,268,091
REACTION THRUST OPERATED MANIPULATOR
Filed June 1, 1961                    2 Sheets-Sheet 1

INVENTOR.
DONALD F. MELTON
BY
*Stuart R. Peterson*
ATTORNEY

Aug. 23, 1966    D. F. MELTON    3,268,091
REACTION THRUST OPERATED MANIPULATOR
Filed June 1, 1961

INVENTOR.
DONALD F. MELTON
BY
Stuart R. Peterson
ATTORNEY

United States Patent Office 3,268,091
Patented August 23, 1966

3,268,091
REACTION THRUST OPERATED
MANIPULATOR
Donald F. Melton, Minneapolis, Minn., assignor to General Mills, Inc., a corporation of Delaware
Filed June 1, 1961, Ser. No. 114,143
1 Claim. (Cl. 214—1)

This invention relates to manipulators and more particularly to manipulators wherein the manipulating forces are produced entirely or in part by thrust-producing reaction motors attached to the manipulator.

The invention can be used for underwater manipulators, for land based manipulators and also provides a manipulator particularly adaptable for use in a gravitationless environment. It can be used for moving objects, performing work functions on such objects, for taking measurements, or for moving cameras and the like. The term manipulator as used herein is defined as an apparatus to perform work, or operate or move one device relative to another. Although the principles described are useful in other than gravitationless environments, operation in this environment is described as an example.

Due to the balance of forces on masses traveling in free space or orbiting around planets, moons, and other celestial bodies, these masses are weightless. This enables very light structures to hold large masses. Theoretically no structure is required to hold them so long as inertial forces due to acceleration do not exist. To perform certain tasks in a gravitationless environment, it is desirable to provide a manipulator which can be positioned and controlled from a vehicle, hereinafter called the control vehicle. After a connection is made with an object, it is often desirable to apply forces to the manipulator structure from the control vehicle by means of a direct mechanical linkage between the manipulator and the control vehicle. In other cases, after a connection is made between the manipulator and an object to be positioned, it is desirable to apply actuating forces on the object by means of the manipulator itself while exerting little if any reaction force on the control vehicle. It is desirable in some instances to establish the general position of the manipulator through a direct mechanical linkage between control vehicle and the manipulator, and to provide means on the manipulator itself for accurate positioning. In still other cases it is desirable to provide the approximate positioning for the manipulator by means of reaction thrust produced at the manipulator and to provide fine positioning for a gripping device or the like mounted on the manipulator by means of a remotely controlled power driven mechanical arm mounted on the manipulator, the latter form of the invention being especially valuable where it is desired to reach into an opening or to grasp a lever or handle or to perform other work functions.

It is thus one object of the present invention to provide a remotely controlled manipulator for spatially positioning objects and performing work functions. More specifically, it is an aim of the invention to accomplish these goals in a gravitationless environment.

It is another object of the present invention to provide a manipulator for use in a gravitationless environment which can be positioned and controlled from a vehicle and wherein motion can be imparted to the manipulator from forces applied to the manipulator by said vehicle.

It is another object of this invention to provide a manipulator, controlled from a vehicle, wherein the manipulator itself can apply forces to an object in order to keep the reaction forces on the control vehicle as low as possible.

It is still another object of this invention to provide an improved manipulator wherein work functions may be carried out by means of a reaction motor connected to said manipulator.

It is another object of this invention to provide a manipulator wherein the propellant is supplied to a reaction motor through a hose communicating between a control vehicle and the manipulator.

It is another object of this invention to provide a manipulator the position of which may be determined at least in part by a direct mechanical linkage with a control vehicle.

It is still another object of this invention to provide a manipulator wherein the manipulator is connected to a vehicle by means of a motor-powered folding connecting means attached between said vehicle and said manipulator.

Briefly stated, the present invention provides a manipulator for positioning objects and performing work functions including a frame, a work performing device such as a pair of gripping jaws, a hook, magnet, rotary tool, television camera or the like attached to said frame, reaction motor means attached to said frame for producing thrust sufficient to move said manipulator, valve means connected to said motor to allow repeated starting and stopping of said thrust, control means remotely positioned from said manipulator for operating said work performing device and said valve means.

According to one preferred form of the invention one or more reaction thrust producing devices such as rocket motor is mounted on the manipulator structure to move a desired object so that the forces exerted by the reaction thrust producing device will not exert a force on a control vehicle wherein controls are being directed to the manipulator. The thrust devices may be operated from the control vehicle by means of electrical, mechanical, fluid or electromagnetic means. Any suitable thrust device known to the art may be used such as fluid under high pressure, mono-propellants, fuel and oxidizer combinations, devices containing radioactive materials from which energy is extracted to accelerate some mass contained in the device, or by pumping a propellant from a control vehicle to the manipulator and allowing the propellant to be expelled through a nozzle located on the manipulator. According to the present invention it is possible to produce all of the following motions: rectilinear motion along three mutually perpendicular axes in both directions along each axis, or rotary motion about three mutually perpendicular axes in both directions about each axis. All or some of these desired motions can be obtained by various arrangements of the thrust producing devices or by selectively valving the propellant through selected nozzles or by turning the nozzles with respect to the motors or by turning the reaction motors with respect to the frame upon which they are mounted. A variety of work performing devices may be attached to the manipulator. These may include gripping hands, hooks, magnets, rotary tools, etc., powered by electric, pneumatic, hydraulic, reactor thrust or other suitable actuating means.

The structure of the manipulator can be of varied types. Being effectively weightless, and since the reactive forces in the structure can be controlled, the structure can be of low mass. To perform a typical task such as making connection between an object and a control vehicle, the manipulator can be joined to the control vehicle by an elongate flexible connecting means such as a cable carrying conductor used for operating the manipulator. This cable is preferably wound around a powered drum, sheave or winch attached to the control vehicle. In operation, the manipulator may be forced outwardly from the prime vehicle by means of a reaction motor attached to the manipulator and steered to the object to be positioned by means more fully described hereinbelow. After an object has been contacted and a connection made by the work performing attachment, the object can be brought to the control vehicle by applying tension to the cable or by actuating the thrust motor or both. As the object nears the control vehicle, reverse thrust can be applied to control the closing rate between the control vehicle and the object to be positioned. In a variation of the above arrangement a plurality of cables are used, the cables being attached to the control vehicle at spaced apart positions and each extended and retracted selectively to control the position and velocity of the manipulator by changing the relative lengths of the several cables.

The invention will be best understood from the illustrations in the accompanying drawings showing several forms of the present invention in which.

Figure 1:
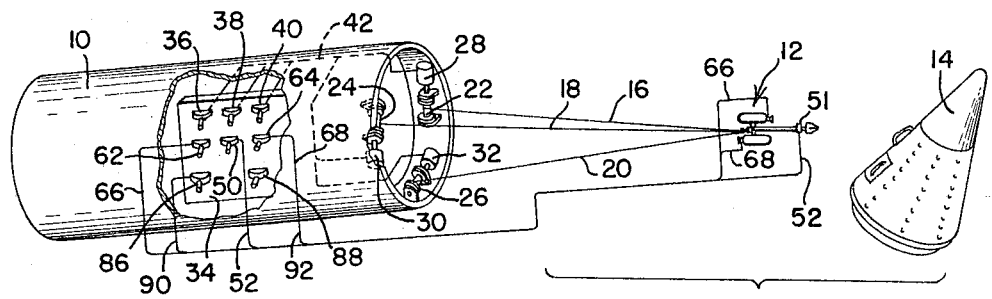
FIGURE 1 is a perspective view of one form of the present invention during use, the manipulator being controlled from a space vehicle and illustrated in a proximal relation with a nose cone that is to be spatially positioned.

Referring now to the drawings and particularly to FIGURE 1 there is shown a vehicle 10, a manipulator 12 according to one form of the present invention and an object such as a nose cone 14 which is to be spatially positioned. The manipulator 12 is connected to the vehicle 10 by means of elongate flexible connecting means such as three cables designated 16, 18 and 20. Cables 16, 18 and 20 are connected at one end to spaced apart winches 22, 24 and 26 respectively attached to the end of vehicle 10. The winches are individually rotatable by means of motors 28, 30 and 32 which are controlled from a control panel 34. The control panel 34 is wired so that each of the winches 22, 24, and 26 may be operated selectively or at different speeds as desired through the agency of several switch or control mechanisms 36, 38 and 40 and conductor cables collectively denoted by the reference numeral 42, whereby the position of manipulator 12 may be controlled at least in part by the relative amount of cable extended or retracted by each winch. During operation, it is preferred that the cables be held taut by operating suitable reaction motors (described more fully hereinbelow) mounted on the manipulator 12 to produce thrust directed away from vehicle 10. By thus operating reaction motors on the manipulator 12 and, for example, by holding the winch 26 stationary and allowing the cables 16 and 18 to be withdrawn from winches 22 and 24 respectively, the position of manipulator 12 in FIGURE 1 will be lowered. By holding winches 22 and 24 stationary and allowing the cable 20 to be payed from winch 26, the position of manipulator 12 of FIGURE 1 will be raised. From the foregoing discussion it may be seen that by selectively operating the winches 22, 24 and 26, the position of manipulator 12 may be controlled through the use of only a single reaction motor rigidly attached to the manipulator frame. Thus, the operator may position the manipulator 12 by control of the reaction motor and winches 22, 24 and 26, until contact is made with the object to be positioned, then turn off the reaction motor of manipulator 12 and pull the object 14 towards vehicle 10 by retracting at least one of the cables. While a plurality of cables may be used to position the manipulator as described, when the manipulator is provided with one or more reaction motors capable of moving the manipulator in various directions as described hereinbelow, a single cable may be used if desired.

Figure 2:
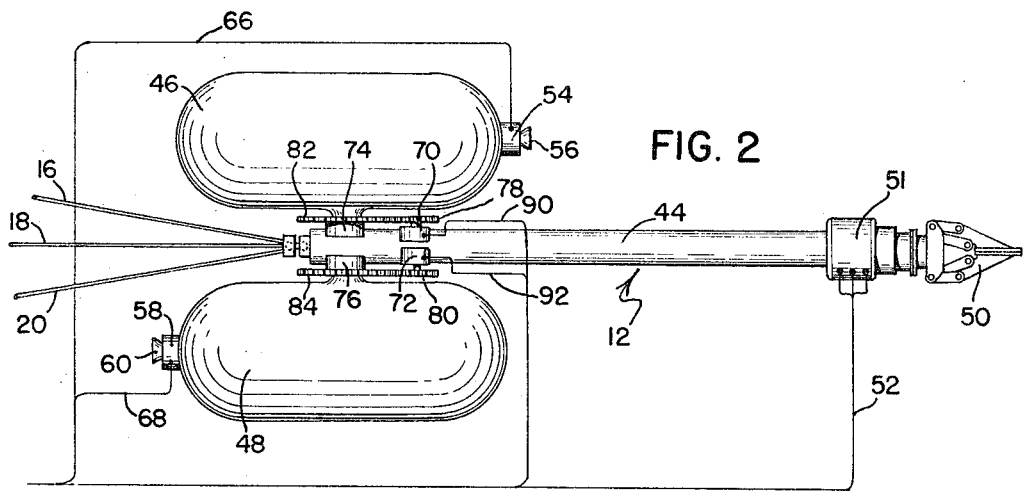
FIGURE 2 is a greatly enlarged side elevation of the manipulator illustrated in FIGURE 1.

Referring now to FIGURE 2 there is shown the manipulator 12 of FIGURE 1 in greater detail. Manipulator 12 comprises a tubular frame 44 having two suitable reaction motors 46 and 48 rotatably mounted at one end of the frame 44. Also included is a handling or object engaging device, such as a pair of gripping jaws 50 mounted at the other end. The jaws 50 may be opened and closed by a suitable actuating motor, such as an electric motor 51 controlled by a switch unit 50 mounted on the control panel 34 and energized via a conductor cable 52. At one end of the motor 46 there is provided a valve 54 and a motor nozzle 56, and at one end of the motor 48 there is provided a valve 58 and a motor nozzle 60. Valves 54 and 58 are preferably conventional solenoid operated valves controlled by means of a pair of switch mechanisms 62, 64 through conductor cables indicated at 66 and 68, respectively. On frame 44 there are provided suitable drive motors, such as electric motors 70, 72 to rotate the reaction motors 46 and 48 upon bearings 74 and 76 with respect to frame 44. Appropriate gearing may be utilized, a pair of drive pinions 78, 80 and driven gears 82, 84 having been pictured. It will be noted that the axis of rotation is thus perpendicular to the thrust axis of each motor. Switch or control units 86, 88 similar to the mechanisms 36–40 may be installed on the panel 34 for controlling the energization of the motors 70, 72 through conductor cables 90, 92 respectively.

It will be appreciated that the various cables 42, 52, 66, 68, 90 and 92 have been only schematically represented and that the various sources of energization have been omitted for drawing simplicity.

With the motors 46 and 48 arranged as illustrated in FIGURE 2, opening of valve 54 will cause efflux gases to flow to the right from nozzle 56 causing the manipulator 12 to move to the left in FIGURE 2, while opening of valve 58 will allow gases to pass out of nozzle 60 toward the left causing manipulator 12 to move to the right. If both valves 54 and 58 are opened simultaneously, a couple will be produced causing the manipulator 12 to rotate counterclockwise about a horizontal axis perpendicular to the frame 44 which is located between the motors 46 and 48, thereby moving or shifting the gripping jaws 50 toward the top of FIGURE 2. If motors 46 and 48 are first rotated 180° with respect to frame 44, and then valves 54 and 58 are opened simultaneously, a couple will be produced causing the manipulator 12 to be rotated in a clockwise direction, thereby moving the jaws 50 toward the bottom of FIGURE 2. If the reaction motors 46 and 48 are rotated 90° from the position shown in FIGURE 2 so that nozzles 56 and 58 point in opposite directions and the valves are then opened simultaneously, a couple will be produced causing the manipulator 12 to rotate about the axis of frame member 44. Rotary motion about the axis of frame member 44 is desirable when gripping jaws 50 are used to rotate a valve, lever or screw.

While three cables 16, 18 and 20 have been shown extending between the manipulator 12 and the vehicle 10, if desired, the manipulator 12 may be positioned entirely by selectively operating motors 46 and 48 in which case only a single cable may be used. If radio control is used no cable will be required. It should be noted that by rotating only one of the motors 46 or 48 at a time, frame 44 will be caused to rotate in the opposite direction. However, if both motors 46 and 48 are rotated simultaneously in opposite directions frame 44 may be maintained stationary because of the torque balance.

Figure 3:
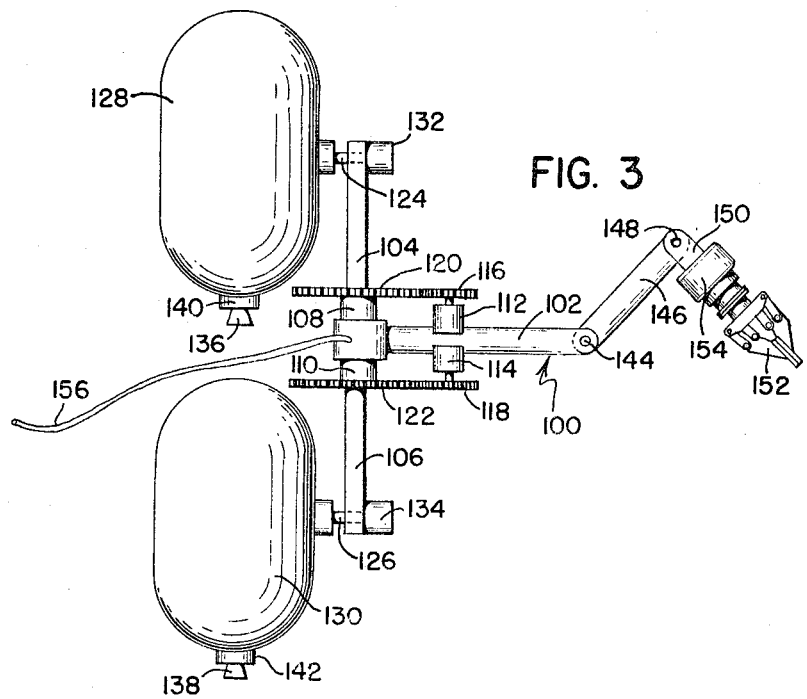
FIGURE 3 is a side elevation of another form of manipulator according to this invention.

Referring now to FIGURE 3, there is shown another embodiment of the present invention. The manipulator 100 in this instance includes a main cylindrical frame member 102, two auxiliary frame members 104 and 106 extending at right angles to member 102 and rotatable about their own axes on bearings 108 and 110, and a drive means such as electric motors 112 and 114 for rotating the members 104 and 106 with respect to member 102 via pinions 116, 118 and driven gears 120, 122. At the outer ends of frame members 104 and 106 there are provided suitable shafts journaled at 124 and 126 respectively for mounting reaction motors 128 and 130.

Drive motors 132, 134 connected to the shafts 124 and 126 are adapted to rotate the reaction motors 128 and 130 with respect to the members 104 and 106. Although the conductor cables have been omitted from FIGURE 3, it will be appreciated that the motors 112, 114, 132 and 134 may be energized and controlled from a panel similar to the panel 34 depicted in FIGURE 1. At one end of each of motors 128 and 130 there are provided motor nozzles 136 and 138, the flow of efflux gas therefrom being controlled by means of solenoid valves 140 and 142.

At the right end of the frame member 102 of FIGURE 3 there is provided a manipulator support bearing 144. Pivotally mounted thereon is a manipulator arm member 146 which may be swung about the bearing 144 by means of a suitable drive motor (not visible). At the right end of the member 146 in FIGURE 3 there is provided a second manipulator bearing 148. Extending from bearing 82 is a second manipulator arm member 150 which may be swung on bearing 148 by means of another suitable drive motor (also not visible). At the end of member 150 is provided a device to be positioned such as a pair of gripping jaws 152. A drive means such as electric drive motor 154 is provided to open and close the jaws 152. If desired, each of the members 146 and 150 may comprise telescoping sections, each of which sections may be extended or retracted.

As can be seen, the nozzles 136, 138 of reaction motors 128 and 130 may be pointed in any desired direction. If the thrust lines of the two units are parallel, and the thrust of each is approximately equal, motion in the opposite direction from which the nozzles are pointed will result. If the motors are rotated so that the nozzles 136 and 138 point in opposite directions, and valves 140 and 142 open simultaneously, a couple will be produced tending to rotate the manipulator about an axis between the reaction motors 128 and 130. An elongate flexible connecting means, such as a cable 156, is connected at one end to a control vehicle similar to the vehicle 10 shown in FIGURE 1 and at the other end to the manipulator 100. As with the previously described motors 112, 114, 132 and 134, appropriate conductors will be provided for operation of the manipulator motor 154 and the other motors associated with the manipulator 100 which do not appear in FIGURE 3. Likewise, conductor cables corresponding to the cables 66, 68 of FIGURES 1 and 2 will be utilized for operating the solenoid valves 140, 142.

The embodiment illustrated in FIGURE 3 is particularly valuable when it is necessary for the work performing device 152 to enter an opening or to reach over an obstruction. Approximate positioning may be accomplished by reaction motors 128 and 130 which serve as an inertial reference system for fine positioning of device 152 through bending of manipulator members 146 and 150.

Figure 4:
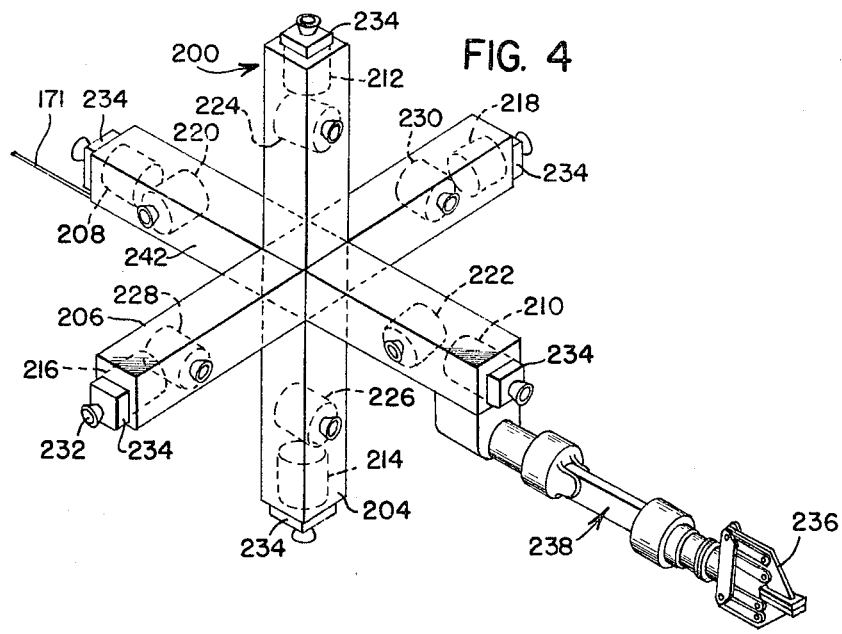
FIGURE 4 is a perspective view of another form of the present invention.

Referring now to FIGURE 4 there is shown still another embodiment of the present invention wherein a manipulator indicated generally by the numeral 200 comprises three mutually perpendicular frame members designated 202, 204 and 206 which are rigidly attached together at their centers by any suitable means. Each of the frame members has mounted near an end thereof oppositely directed reaction motors designated 208 and 210, 212 and 214, 216 and 218, respectively. Additional reaction motors 220 and 222, 224 and 226, 228 and 230 are arranged transversely on the various frame members 202, 204 and 206, respectively. Each of the motors 208-230 is provided with a nozzle 232 and solenoid valve 234. Thus, it will be discerned that the motors 208, 210 have their nozzles 232 pointing outwardly along the axis of the frame member 202, that the motors 212, 214 have their nozzles 232 pointing outwardly along the axis of the frame member 204, and that the motors 216, 218 have their nozzles 232 pointing outwardly along the axis of the frame member 206. On the other hand, the motors 220, 222, have their nozzles 232 pointing in directions at right angles to the nozzles 232 associated with the motors 208, 210. Similarly, the motors 224, 226 are arranged so that their nozzles 232 point at right angles to the nozzles 232 of the motors 212, 214. Finally, the nozzles 232 of the motors 228, 230 are arranged so as to point perpendicularly with respect to the nozzles 232 belonging to the motors 214, 216. By activating one of the motors 208-218 whose axis is coextensive with the axis of its frame member 202, 204, or 206, the manipulator 200 may be caused to move along the motor axis in a direction opposite from the flow of gases. Activating any one of the motors 220-226 mounted on the same frame member transverse to the axis thereof will cause rotation of the manipulator about an axis located between it and the other motor carried on the same frame member. By this means rectilinear motion or rotation about any desired axis may be obtained by activating selected motors either singly or in combination.

A suitable gripping device 236 similar to that illustrated in FIGURES 2 and 3 may be attached to the end of the frame member 202 as in the embodiments illustrated above, the arm mechanism in the instant embodiment having only been generally designated by the reference numeral 238. The motors 208-230 preferably contain a sufficient supply of fuel so that they may be activated a number of times before the fuel is exhausted.

If desired, compound or combination motions can be produced by actuating proper units. Motion may be produced by throttling or modulating the flow of gas or can be of the on-and-off type controlled by the use of the solenoid operative valves that have been shown. A cable 240 connected between the manipulator and a vehicle, such as the vehicle 10 in FIGURE 1, with attached conductors (not shown) may be used to operate the motor valves 234 and the drive motor for opening and closing the gripping jaws 236 in a manner hereinbefore described more fully.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

Now, therefore, I claim:

A reaction thrust operated manipulator comprising a frame, a work performing device carried by said frame, reaction motor means attached to said frame for producing thrust, said motor means including at least a first motor means for producing thrust sufficient to cause said work performing device to move in both directions along one of three mutually perpendicular axes, a second motor means for producing thrust sufficient to cause said work performing device to move in both directions along another of said three mutually perpendicular axes, a third motor means for producing thrust sufficient to cause said work performing device to move in both directions along the third of said three mutually perpendicular axes, a fourth motor means for producing thrust sufficient to cause said work performing device to rotate clockwise and counterclockwise about said one of said mutually perpendicular axes, a fifth motor means for producing thrust sufficient to cause said work performing device to rotate clockwise and counterclockwise about said another of said mutually perpendicular axes, and a sixth motor means for producing thrust sufficient to cause said work performing device to rotate clockwise and counterclockwise about said third of said mutually perpendicular axes, and means for individually controlling said reaction motor means to cause any of said movements and rotations of said device.

References Cited by the Examiner
UNITED STATES PATENTS

| | | | |
|---|---|---|---|
| 2,061,256 | 11/1936 | Romano. | |
| 2,736,600 | 2/1956 | Carlson | 294—88 |
| 2,805,349 | 9/1957 | Friedman. | |
| 2,805,781 | 9/1957 | Senn | 212—58 |
| 2,858,947 | 11/1958 | Chapman. | |
| 2,981,501 | 4/1961 | Schaeffer | 244—52 |
| 3,043,448 | 7/1962 | Melton. | |

GERALD M. FORLENZA, *Primary Examiner.*

HUGO O. SCHULZ, ERNEST A. FALLER, *Examiners.*

R. G. SHERIDAN, *Assistant Examiner.*